Patented July 10, 1951

2,560,421

UNITED STATES PATENT OFFICE 2,560,421

HALOGENATED TERTIARY ALKYL SULFIDES AND POLYSULFIDES

Lawrence T. Eby, Roselle, N. J., assignor to Standard Oil Development Company, a corporation of Delaware No Drawing. Application June 28, 1947, Serial No. 757,921

16 Claims. (Cl. 260—608)

This invention pertains to halogenated tertiary alkyl sulfides and polysulfides. More specifically, the invention pertains to new compounds of the general character mentioned above, which are useful in mineral oil compositions for various purposes. The present application is a continuation-in-part of my prior application, Serial No. 674,373, filed June 4, 1946.

It is an object of the present invention to combine certain chlorinated alkyl compounds by a new process in such a manner as to produce new organic polysulfides which can be used in mineral oils for various purposes. A further object is to prepare compounds of the character referred to which can be used in lubricating oils as extreme pressure agents and in Diesel fuels as ignition promoters and antioxidants.

The materials with which my invention is concerned may also be used for various other purposes, such as insecticides, fungicides, and the like, and further purposes and uses will appear as this description proceeds.

Prior to my invention it was known that alkyl sulfides containing halogen substituents could be made and used in oils as extreme pressure additives. These halogenated alkyl sulfides have always had the halogen attached to carbon atoms which were in turn attached to other carbon atoms which had hydrogen attached thereto and consequently could be easily dehydrohalogenated. I have now discovered a new class of halogenated alkyl sulfides in which the halogen atom is attached to carbon atoms attached only to other carbon atoms. The halogen is not directly attached to a carbon atom which is in turn attached to another hydrogen atom or a sulfur atom.

Halogenated disulfides of the character referred to may be prepared, I have discovered, either by direct halogenation of the disulfides after mercaptans have been combined, or by halogenation of the mercaptans. In the latter process sulfur chloride derivatives are made as intermediates which in turn react with other mercaptan molecules to form disulfides. Polysulfides, other than disulfides, also may be produced by my invention and particularly useful properties are found to result when the halogen is combined in a particular manner as will next be described.

The halogen usually but not necessarily preferred is chlorine due to its cheapness and availability. I have found that the particular compounds prepared according to my invention are more stable to heat than most other halogenated polysulfides and this in itself imparts particular advantages to the compositions for certain purposes. For example, compounds prepared according to my invention have been found to be excellent load-carrying agents for extreme pressure lubricants.

The general type of compounds used in my invention is represented by the following structural formula where the R groups may be similar organic groups, such as halogenated methyl groups, and the like, or may be dissimilar. At least one of the R groups must contain a halogen atom attached to a carbon atom. The number of sulfur atoms represented by $x$ will normally be at least 2 and may be 3, 4, or more:

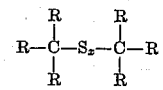

Other substituent groups may be included such as —OH, —COOH, —OCH$_3$, —NO$_2$, —NH$_2$, —CNS, —SO$_3$H, —COOR, etc. The sulfur atoms of the halogen-organic sulfides of this type are less corrosive to copper and to other metals than are halogen-organic sulfides of similar sulfur content which have previously been used in extreme pressure lubricants. For example, extreme pressure lubricants which have been used in mineral oil lubricants in the past have not had tertiary-alkyl groups attached to sulfur as they are in this invention. The number of sulfur atoms present in the molecule may vary from 1 to 8, but the preferred numbers are from 1 to 4, 2 to 4 being the most suitable for extreme pressure purposes. Ordinarily the composition will have at least 8 carbon atoms and it may have up to 26 or more.

Halogen atoms may also be attached to a carbon atom in an aryl ring, in a heterocyclic ring, or in a paraffinic group, but the preferred type of halogen linkage is that where the halogen is directly connected to a carbon atom which in turn is directly attached to another carbon atom having no hydrogen atoms immediately attached thereto. This type of compound is obtained, for example, when di-tertiary-butyl polysulfide or di-tertiary-octyl polysulfide is chlorinated. In this case, the tertiary-octyl group is derived from diisobutylene. Replacement of any one of the hydrogen atoms results in a stable primary chloride with no hydrogen atoms on any adjacent carbon atom. This is illustrated by the following formula of di-tertiary-octylpolysulfide:

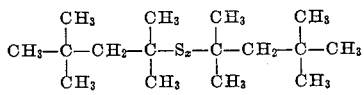

It will be noted that in this formula no halogen is shown, but one or preferably more of the hydrogen atoms would be replaced preferably by chlorine for reasons of availability and economy.

Other molecular structures where part of the halogen is added in a stable form as in the case just described and where another part is less stable, are also desirable for use in extreme pressure lubricants. An example of a suitable compound of this type is the chlorination product of di-tertiary-octyl polysulfide where the tertiary-octyl group is derived from a codimer of isobutene and normal butenes. Other halogens obviously may replace chlorine in the same composition.

My invention includes also halogen derivatives of mixed tertiary-alkyl and primary-alkyl, secondary-alkyl or aryl sulfides and polysulfides of the following general formula:

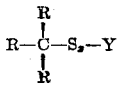

In this formula each of the elements R is an organic group, either alkyl, cyclic, or aryl, $x$ is an integer having the value from 1 to 8 and preferably 1 to 4, and Y may be either a primary-alkyl, secondary alkyl, tertiary alkyl or an aryl group. Examples of this type of sulfide which may be halogenated are the tertiary-octyl n-amyl polysulfides, the monosulfides of the same composition, tertiary-butyl phenyl polysulfides, tertiary-amyl isopropyl polysulfides, tertiary-octyl nitrophenyl sulfides and polysulfides and the like.

The halogenated disulfides and other polysulfides of this invention may be prepared as indicated above either by direct halogenation of the disulfides or polysulfides, or by halogenation of the mercaptans simultaneously with formation of the disulfides, or by halogenation of a tertiary-alkyl mercaptan and subsequent reaction with a mercaptan. Halogenated monosulfides are prepared by direct halogenation.

Compounds of the foregoing character, and which may be halogenated for the purposes of my invention, may be either symmetrical or asymmetrical. Examples of symmetrical di-tertiary-alkyl sulfides are: di-tertiary-butyl sulfide, di-tertiary-butyl disulfide, di-tertiary-butyl trisulfide, di-tertiary-butyl tetrasulfide, di-tertiary-amyl trisulfide, di-tertiary-hexyl disulfide, di-tertiary-heptyl tetrasulfide, di-tertiary-octyl disulfide, di-tertiary-octyl trisulfide, di-tertiary-octyl tetrasulfide, di-tertiary-dodecyl trisulfide, di-tertiary-decyl trisulfide, etc.

Examples of asymmetrical di-tertiary-alkyl polysulfides and sulfides are tertiary-butyl tertiary amyl sulfide, tertiary-butyl tertiary octyl disulfide, tertiary-butyl tertiary-octyl trisulfides, tertiary-butyl tertiary-octyl tetrasulfide, tertiary-butyl tertiary decyl disulfide, tertiary-butyl tertiary dodecyl disulfide, tertiary-octyl tertiary-dodecyl trisulfide, etc. As will be seen from these examples, the preferred composition will have ordinarily from about 8 to about 24 total carbon atoms per molecule.

Other examples of this invention are obvious from the above disclosure and it is not intended to limit the invention by the specific examples cited here. Other groups, such as wax compositions, which may be used to introduce special properties, are included in this invention, e. g. tertiary-octyl wax polysulfides may be chlorinated to form a product of good stability and solubility which would be a product of this invention. By appropriate choice of the materials to be halogenated, specific properties such as pour point, viscosity, and the like may be modified as desired.

As described in detail in the parent application, Serial No. 674,373, mentioned above, di-tertiary disulfides are conveniently prepared by oxidation of tertiary mercaptan with oxygen, halogen or sulfur. The trisulfide may be prepared by reacting the tertiary mercaptan with sulfur or with sulfur dichloride, or by reacting the disulfide with sulfur. The tetrasulfides may be prepared by reacting the tertiary mercaptan with sulfur monochloride. Still higher sulfides may be prepared by using larger quantities of sulfur halides or by reacting lower sulfides with additional sulfur. Loosely combined sulfur in the products may be removed by means of a "sweetening" or sulfur dissolving agent, e. g., an ammonium sulfide solution.

Examples of this invention may be cited:

*Example 1*

To 292 parts by weight of tertiary-octyl mercaptan were added 113.3 parts of sulfur dichloride with stirring. Chlorine gas was next introduced into the resulting solution at a temperature of about 75-80° C. The product was then blown with air and thereafter with ammonia gas to remove the hydrogen chloride after 33.6 parts of chlorine had been absorbed (this was the gain in weight during addition of chlorine). The product was filtered and the filtrate was analyzed for 26.36% sulfur and 10.95% chlorine. This product was found to be corrosive to copper so it was treated with aqueous ammonium sulfide to remove the active sulfur and chlorine. The product was next distilled under reduced pressure to remove any material which was volatile at 100° C. at 1 mm. pressure. The residue was found to be a brownish-orange colored viscous liquid which analyzed 30.17% sulfur and 3.49% chlorine. When this product was added to a conventional gear lubricating oil in 5% concentration it did not blacken a polished copper strip after 1 hour at 212° F. This lubricating composition carried a 275 lbs. scale reading on the S. A. E. extreme pressure lubricant testing machine at 1000 R. P. M. at 14.6/1 slip ratio.

*Example 2*

To 292 parts by weight of tertiary-octyl mercaptan (obtained by treating diisobutylene with $H_2S$) were added 113.3 parts of sulfur dichloride. Chlorine gas was bubbled into the resulting solution at 75 to 85° C. until the weight increased by 68.5 parts, indicating the addition of approximately 15% chlorine by weight. Air was blown through the solution to remove the hydrogen chloride, followed by blowing with ammonia gas. The solution was then filtered. The filtrate analyzed for 29.09% sulfur and 18.45% chlorine. This material was also found to be corrosive to copper so it was treated with aqueous ammonium sulfide to remove the active sulfur and chlorine. The volatile material was stripped off by vacuum over a boiling water bath and the residue was analyzed and found to contain 27.4% sulfur and 10.80% chlorine. A solution of 5% of this residue in the same gear oil base as mentioned above did not blacken a polished copper strip after 1 hour at 212° F. This solution carried 268 scale reading on the S. A. E. testing machine at 1000 R. P. M. and 14.6/1 slip ratio, as compared with the reading of 275 for the lubricant containing the composition of Example 1.

Although the above examples illustrate specifically the use of chlorine, it will be understood that halogenation may be similarly accomplished by the use of bromine or the other halogens. The compositions of Examples 1 and 2, and in fact any of the compositions described herein, may be used in mineral oils in varying proportions, depending upon the particular purpose in view. In general, they will be used in proportions of 1 to 20% by weight, based on the total composition. For some purposes as little as 0.1% will be found useful.

It will be understood that various other additives may be present in such oils and are not to be excluded by reference to mineral base oils and the like. Such other additives may be pour point depressors, thickening compounds, oxidation inhibitors, oiliness agents and the like. My compositions may be prepared and marketed by themselves, or in concentrated form, if desired, for subsequent addition to fuel oils, lubricating oils, greases, insecticides, and the like, as will be apparent to those skilled in the art.

The products of my invention obviously may be further treated with sulfur or sulfur-bearing materials, such as $P_2S_5$, $P_2S_3$, and the like, to increase their sulfur content and to make them more effective load-carrying agents. The extreme pressure properties of the phosphorus-sulfur compounds is well known in the art.

Another aspect of my invention involves the reaction of previously halogenated mercaptans with tertiary-alkyl mercaptans to form the very useful class of compounds, the tertiary-alkyl halogenated disulfides, some of which are included in the above. These compounds, in turn, may be further treated with sulfur or with sulfur-containing compounds, such as $P_2S_5$, $P_2S_3$, $S_2Cl_2$, and the like, to make polysulfide derivatives. The resulting compounds are especially useful in lubricants, insecticides, fungicides, rubber and polymer compositions, and also in motor fuels, especially Diesel fuels. In lubricants, they act not only as load-carrying agents, but also as oiliness agents and as oxidation inhibitors. Because of these properties they may be used also in crank case oils and in gear lubricants. In insecticides, they are toxicants. In fuels, they appear to increase markedly the ignition of the fuel and they serve also as antioxidants.

*Example 3*

As a further specific example a tertiary-octyl trichlormethyl disulfide was prepared from a tertiary-octyl mercaptan and perchlormethyl mercaptan. The tertiary-octyl trichlormethyl disulfide was then chlorinated by passing chlorine gas therethrough. The product was found to have valuable extreme pressure properties and also to be an effective insecticide. 5% of this chlorinated product in a standard gear lubricating base oil stock did not blacken polished copper after 1 hour at 212 F. It carried a scale reading of about 375 pounds on the S. A. E. testing machine. Other halogens may be used in place of chlorine. The composition of Example 3 may of course be used in varying quantities in mineral oil compositions such as Diesel fuels, lubricating oils, and the like. In general the proportions will be from 1 to 10% although greater or lesser quantities may be used in some cases.

It will of course be understood that my invention comprehends variations and modifications not specifically mentioned above, as will be obvious to those skilled in the art. Hence it is not intended to limit the invention except as required by the prior art and by the appended claims.

I claim:

1. The process of preparing halogenated tertiary alkyl polysulfides of the general formula

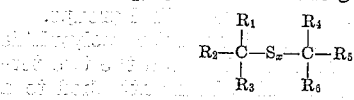

wherein $R_1$, $R_2$, etc. are hydrocarbon radicals at least one of which is halogenated, said formula comprising a total of about 8 to about 24 carbon atoms and $x$ is an integer of at least 2, which comprises combining two tertiary mercaptans by oxidizing them to remove hydrogen, halogenating at least one of said tertiary groups, by attaching halogen to a carbon atom immediately adjacent a carbon atom which has no hydrogen attached and treating the product with a sweetening agent to reduce its corrosivity to metals.

2. Process according to claim 1 wherein halogenation is accomplished prior to combining the mercaptans.

3. Process according to claim 1 wherein halogenation is accomplished subsequently to combining the mercaptans.

4. Process according to claim 1 wherein halogenation is accomplished substantially simultaneously with the combining of said mercaptans.

5. The process of preparing chlorinated tertiary alkyl polysulfides of the general formula

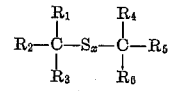

wherein $R_1$, $R_2$, etc., are alkyl radicals at least one of which is chlorinated on a carbon atom immediately adjacent a carbon atom which bears no hydrogen, said formula comprising a total of about 8 to 24 carbon atoms and $x$ is an integer having a value of at least 2, which comprises combining two tertiary alkyl mercaptans by oxidizing them, chlorinating at least one of said mercaptans, and treating the product with a sweetening agent to reduce its corrosivity to metals.

6. Process according to claim 5 wherein oxidation is accomplished by using a chlorine-containing material.

7. Process according to claim 5 wherein said sweetening agent is ammonium sulfide.

8. Process according to claim 5 wherein chlorination is effected prior to combining the mercaptans.

9. Process according to claim 5 wherein chlorination is effected substantially simultaneously with the combining of the mercaptans.

10. Process according to claim 5 wherein chlorination is effected subsequently to the combining of the mercaptans.

11. A halogenated di-tertiary polysulfide composition of the general formula

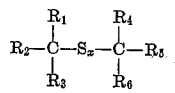

wherein $R_1$, $R_2$, etc., are hydrocarbon radicals at least one of which is halogenated on a carbon atom adjacent a carbon atom which bears no hydrogen and $x$ is an integer having a value of at least 2, said composition containing a total of about 8 to about 24 carbon atoms and having been treated with a sweetening agent to reduce its corrosivity toward metals.

12. Composition according to claim 11 where $x$ is not more than 8.

13. Composition according to claim 11 wherein $x$ is 2 to 4.

14. Composition according to claim 11 wherein the halogen is chlorine.

15. Composition according to claim 11 wherein all the groups $R_1$, $R_2$, etc., are methyl groups.

16. Chlorinated di-tertiary octyl polysulfide having 2 to 8 sulfur atoms between the two tertiary octyl groups, chlorine being attached to a carbon atom adjacent to the tertiary carbon which in turn is attached to sulfur, and treated with a sweetening agent to remove loosely combined sulfur.

LAWRENCE T. EBY.

REFERENCES CITED

The following references are of record in the file of this patent:

UNITED STATES PATENTS

| Number | Name | Date |
|---|---|---|
| 2,197,781 | Badertscher et al. | Apr. 23, 1940 |
| 2,246,314 | Mikeska | June 17, 1941 |
| 2,273,471 | Kimball | Feb. 17, 1942 |
| 2,326,102 | Nygaard et al. | Aug. 3, 1943 |
| 2,329,324 | Berger et al. | Sept. 14, 1943 |
| 2,349,191 | Olin et al. | May 16, 1944 |
| 2,354,230 | Walter | July 25, 1944 |
| 2,442,134 | Lieber et al. | May 25, 1948 |